United States Patent [19]

Furumiya

[11] Patent Number: 5,602,813

[45] Date of Patent: Feb. 11, 1997

[54] DISK, DISK RECORDING APPARATUS AND DISK REPRODUCING APPARATUS

[75] Inventor: Shigeru Furumiya, Katano, Japan

[73] Assignee: Matsushita Electric Industrial Co., Ltd., Osaka, Japan

[21] Appl. No.: 474,132

[22] Filed: Jun. 7, 1995

Related U.S. Application Data

[63] Continuation of Ser. No. 96,440, Jul. 26, 1993, abandoned.

[30]  Foreign Application Priority Data

Jul. 27, 1992  [JP]  Japan .................................. 4-199386

[51] Int. Cl.⁶ ...................................................... G11B 7/00
[52] U.S. Cl. ................................ 369/50; 369/59; 369/48; 369/275.4
[58] Field of Search .................................. 369/47, 48, 49, 369/50, 54, 58, 93, 275.2, 275.3, 124, 59, 275.1, 275.4

[56]  References Cited

U.S. PATENT DOCUMENTS 4,873,679  10/1989  Murai et al. ........................... 369/93 X
5,153,869  10/1992  Yoshimaru et al. ................... 369/50 X
5,214,627   5/1993  Nakashima et al. ................... 369/50 X
5,228,020   7/1993  Shiragami et al. ....................... 369/50

FOREIGN PATENT DOCUMENTS 3-40225  2/1991  Japan .

*Primary Examiner*—Muhammad N. Edun
*Attorney, Agent, or Firm*—Wenderoth, Lind & Ponack

[57]  ABSTRACT

When recording data, a disk jitter is detected by a rotary encoder to obtain a rotation synchronizing clock which coincides in time axis variation therewith. The data are written once into a memory and then, read out at a timing in accordance with the rotation synchronizing clock to be recorded on a disk, thus forming a disk in which data signals between each of adjacent tracks closely coincide in clock phase with each other. When reproducing the data, a reproduced signal reproduced by one beam is subjected to A/D conversion, then, delayed by one rotation of the disk successively through a first memory and a second memory to obtain respective signals of adjacent tracks, whereby the crosstalk component is canceled from the data signal of a targeted track by a calculation circuit.

3 Claims, 4 Drawing Sheets

DISK, DISK RECORDING APPARATUS AND DISK REPRODUCING APPARATUS

This application is a Continuation of now abandoned application Ser. No. 08/096,440, filed Jul. 26, 1993, now abandoned.

BACKGROUND OF THE INVENTION

1. Field of the Invention

This invention relates to a disk used as an optical information recording medium, a disk recording apparatus for recording data on the disk, and a disk reproducing apparatus for reproducing data from the disk.

2. Description of the Prior Art

As a recording medium capable of high density recording of data, an optical disk is known. As one method of further improving the recording density of the optical disk, such a method is considered that the gap between each adjacent signal recording tracks is narrowed in order to improve the recording density in the radial direction of the disk. In this case, however, if a reading laser beam used during reproduction does not have a satisfactorily small spot diameter, narrowing the gap between adjacent recording tracks simply results in signals of the tracks to a targeted track being readout in addition to the signal of the targeted track, thus causing a problem in that unnecessary crosstalk components are mixed into a reproduced signal at the signal detection stage. The existence of crosstalk causes an inter-code interference between signal tracks, resulting in an increase in error rate of a reproduced signal. As a result, an attempt has been made to electrically cancel any crosstalk component developed through the optical reproducing system to improve the quality of a reproduced signal. For example, a method disclosed in Japanese Laid-Open Patent Application No. 3-40225 solves such a problem by presenting a reproduction method using a plurality of laser beams. That is, other than the laser beam for reproducing the targeted track, a plurality of laser beams are additionally provided for reproducing the track adjacent thereto in order to obtain crosstalk signals. These plural laser beams reproduce signals independently and then, the signals of the adjacent tracks are electrically subtracted from the signal of the targeted track including crosstalk signals to thereby reduce the crosstalk component.

In addition, as one method of recording signals on a disk, a constant angular velocity (CAV) system is known, in which a signal is recorded on or reproduced from a disk while the disk is being rotated at a constant angular velocity. In general, recording is made while controlling the rotation of the disk at a constant rotational speed by phase-synchronizing a spindle motor with the reference clock synchronized with the recording data.

However, with the method disclosed in Japanese Laid-Open Patent Application No. 3-40225, other than the laser beam for reproducing a targeted track, two laser beams and optical detectors are respectively provided for reproducing the adjacent tracks thereto, requiring three optical reproducing systems in total, which means that becomes complex and the operation difficult compared with the system using one laser beam for reproduction. In addition, other than the optical system, three signal processing system each including a pre-amplifier, an A/D converter, a digital filter and the like are required, thus causing an increase in production costs.

Here, the signals of the track adjacent to the targeted track are respective signals reproduced one rotation before and one rotation after the targeted signal when rotating the disk for continuous reproduction. As a result, it is theoretically possible to obtain the signals the adjacent tracks using two signal delay circuits each delaying a signal for one rotation of the disk. However, with a conventional disk, it was extremely difficult to obtain signals of one rotation before and one rotation after the targeted signal. This is because even with the CAV system having the rotation controlled at a constant rotational speed by a servo circuit, a jitter or unevenness of rotation, called wow flutter, due to unevenness in torque of the spindle motor, eccentricity of gravity of the disk and the like can unavoidably develop. As a result, even if a signal having a stable time axis is recorded directly on a disk having an unevenness in rotation, the disk to be obtained will be unstable in the number of clocks of the recorded signal for one rotation of the disk and the clock phase of the recorded signal. FIG. 5 shows an example the signal arrangement of the conventional disk shown above. From a reproduced signal of such a conventional disk, accurate signals of the tracks adjacent to the targeted track could not be obtained even if signal delay circuits each for one rotation of the disk are employed.

Therefore, with a conventional disk recording apparatus, signal data cannot be recorded on the disk so that the recorded signals of the tracks adjacent to the targeted track can be closely coincided in phase with each other, and with a conventional disk reproducing apparatus, it is very difficult to obtain accurate signals of the adjacent tracks.

SUMMARY OF THE INVENTION

An object of this invention is to provide a disk recording apparatus in which signal phases between each adjacent tracks of the disk are closely coincided with each other when recording a signal, a disk having signal phases closely coincided with each other between each adjacent tracks thereof, and a disk reproducing apparatus which when reproducing a signal from the disk, reproduces the signal through a conventional one beam optical head and one signal processing system and electrically cancels any crosstalk components from each of the adjacent tracks.

In order to attain the above-mentioned object, a disk recording apparatus of this invention comprises a spindle motor for rotating a disk, a rotary encoder for generating a synchronizing pulse synchronized with a rotation phase of the disk, a servo circuit for controlling the spindle motor in response to a reference clock and the synchronizing pulse, a clock reproducing circuit for generating a rotation synchronizing clock phase-synchronized with the synchronizing pulse, a memory for writing thereinto a data input signal with the reference clock and reading therefrom the written data with the rotation synchronizing clock to obtain a recording signal, a laser modulator for generating a modulated laser beam in response to the recording signal, an optical head for focusing the modulated laser beam on a surface of the disk to record the recording signal, and a shifting means for moving the optical head fin a radial direction of the disk.

In addition, a disk reproducing apparatus of this invention comprises a spindle motor for rotating the disk, an optical head for detecting a recorded signal from the disk using a laser beam to obtain a reproduced signal, a shifting means for moving the optical head in a radial direction of the disk, a pre-amplifier for amplifying the reproduced signal, a clock reproducing circuit for generating a reproduced clock phase-synchronized with an output signal of the pre-amplifier, an A/D converter for sampling the output signal of the pre-amplifier with the reproduced clock to obtain a digital data signal, a first memory for obtaining, when the digital data signal is defined as a reproduced signal of an (n+1)th track (where n is an integer), a reproduced signal of an nth track by delaying the reproduced signal of the (n+1)th track by one rotation of the disk, a second memory for obtaining a reproduced signal of an (n−1)th track by further delaying the reproduced signal of the nth track by one rotation of the disk, and a calculation circuit for adding a signal obtained by multiplying the reproduced signal of the (n+1)th track by a coefficient, a signal obtained by multiplying the reproduced signal of the (n−1)th track by a coefficient and the reproduced signal of the nth track to thereby obtain an output reproduced signal.

As a result, according to this invention, if a disk has a rotation jitter, a signal is subjected to time axis modulation with a clock phase-synchronized with the rotation jitter through a memory and recorded on the disk. Accordingly the position where any signal pit is formed on the disk is determined, the number of clocks for one rotation of the disk is made constant between a recorded signal of one track and each of the recorded signals of the tracks just adjacent thereto, and the clock phases between each adjacent tracks are coincided with each other.

Further, from a signal reproduced by one beam from the disk, the signals of just tracks adjacent to the target track, that is, the crosstalk signals can be obtained by a delay means comprising two memories each for signal delay of one rotation of the disk. As a result, since the three signals including the signal of the targeted track and respective signals of the adjacent tracks are processed in the calculation circuit, the signal of the targeted track can be reproduced with the crosstalk component canceled.

DESCRIPTION OF THE PREFERRED EMBODIMENTS

Figure 1:
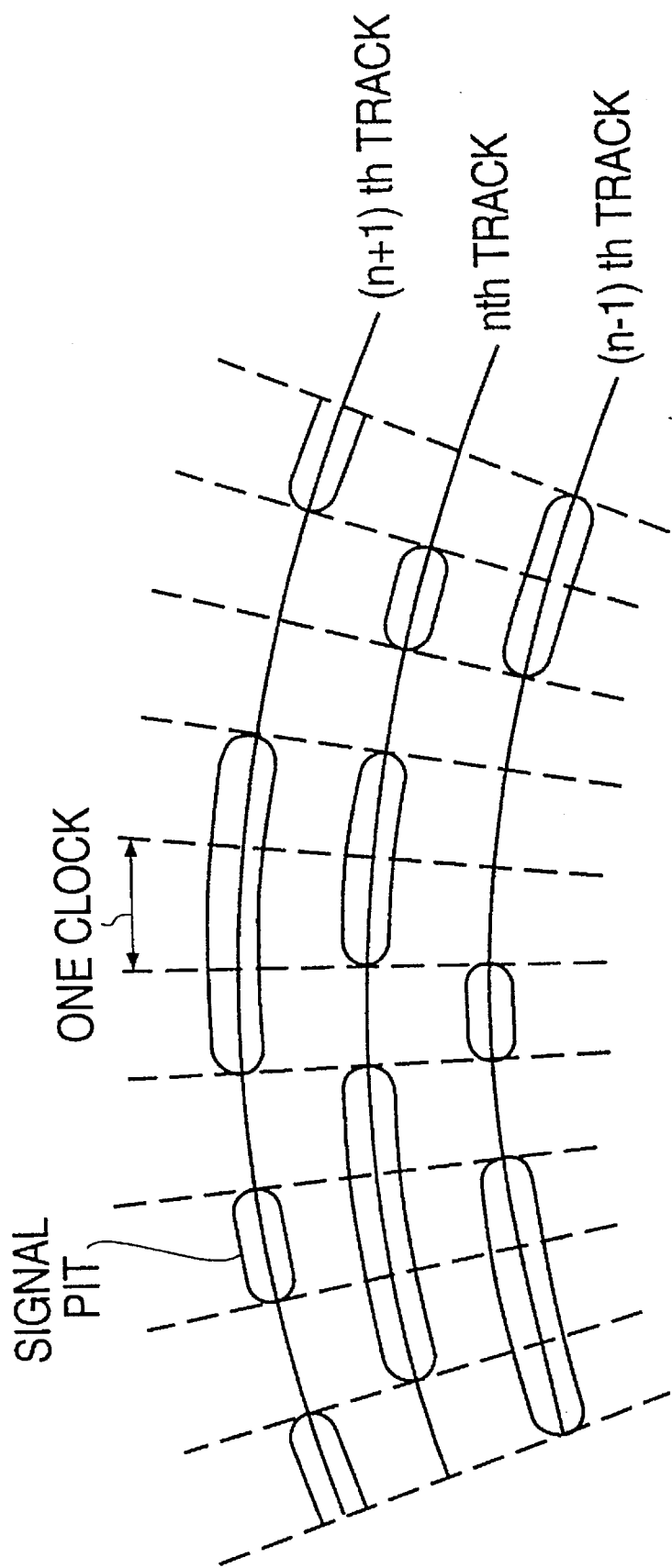
FIG. 1 is a signal arrangement diagram of a disk according to one embodiment of this invention.

One embodiment of this invention will be described in detail below while referring to the drawings. FIG. 1 is a signal arrangement diagram of a disk according to one embodiment of this invention and FIG. 2 is a block diagram of a disk recording apparatus according to one embodiment of this invention.

Figure 2:
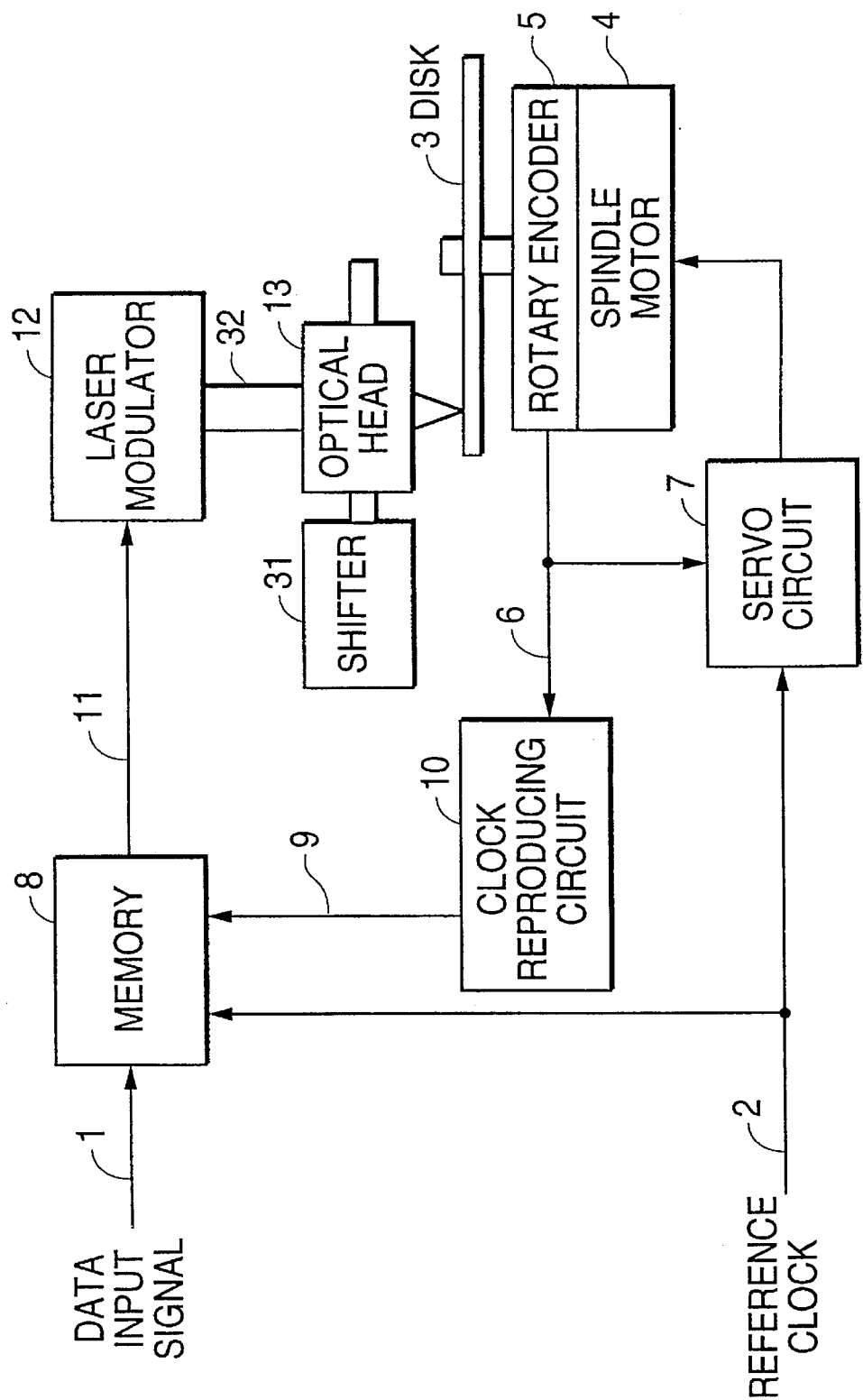
FIG. 2 is a block diagram of a disk recording apparatus according to one embodiment of this invention.

In FIG. 2, a reference numeral 1 is a data input signal which is formed of data of a PCM audio signal, digital video signal or the other signal, or its modulated digital data, and 2 is a reference clock signal which is formed of a clock synchronized in phase with the data input signal 1. In order to rotate a disk by means of the CAV system, that is, to control it at a constant rotational speed, a disk 3 is rotated by a spindle motor 4 to drive a rotary encoder 5 which is disposed coaxially with the disk 3 and the spindle motor 4 to generate a synchronizing pulse 6 synchronized with a rotation phase. A servo circuit 7 controls the spindle motor 4 so that the phase difference between the synchronizing pulse 6 and the reference clock 2 substantially becomes null. In this case, however, the disk 3 may be more or less gravitationally eccentric in, and if the spindle motor 4 is driven at a constant electric current, unevenness of torque will taken place in general. The servo circuit 7 operates to cancel such unevenness of torque generation. However, the time constant of the control becomes large due to the inertia of each of the disk 3 and the spindle motor 4 and a response of the servo circuit 7 to such torque unevenness is delayed, so that it is impossible cancel the jitter of rotation completely. As a result, rotation phase information containing the rotation jitter component is provided as the synchronizing pulse 6.

Here, in the case where the disk has no rotation jitter, if a signal having a stable time axis is recorded, it becomes constant in phase between each adjacent tracks of the disk. However, as explained above, it is impossible to actually cancel the rotation jitter completely. As a result, if a signal is recorded while changing the time axis of the signal in response to the rotation jitter of a disk, the phase of the signal with respect to the position of the disk becomes always constant and as a result, the phase between each adjacent tracks of the recorded signal becomes constant, so that the number of clocks of the data per one complete rotation of the disk also becomes always constant. FIG. 1 is an example showing a signal arrangement of the disk recorded as described above.

The data input signal 1 is written once into a memory 8 with the reference clock 2. A rotation synchronizing clock 9 phase-synchronized with the synchronizing pulse 6 is generated by a clock reproducing circuit 10. Then, by reading out from the memory 8 in accordance with the rotation synchronizing clock 9, a recording signal 11 which coincides with a change in the rotation jitter of the disk 3 can be obtained. The recording signal 11 is sent to a laser modulator 12 to generate a modulated laser beam 32 and the modulated laser beam focused through an objective lens of an optical head 13 to thereby be recorded on the disk 3. Then, the optical head 13 is moved in the radial direction of the disk 3 by a shifter 31 to form signal pits on the disk 3 successively.

According to the structure and procedures as described above, the disk recording apparatus of this invention makes it possible to provide a disk which has recorded signals constant in phase between each adjacent tracks and recorded data which closely coincides in clock number for one rotation of the disk.

Figure 4A:
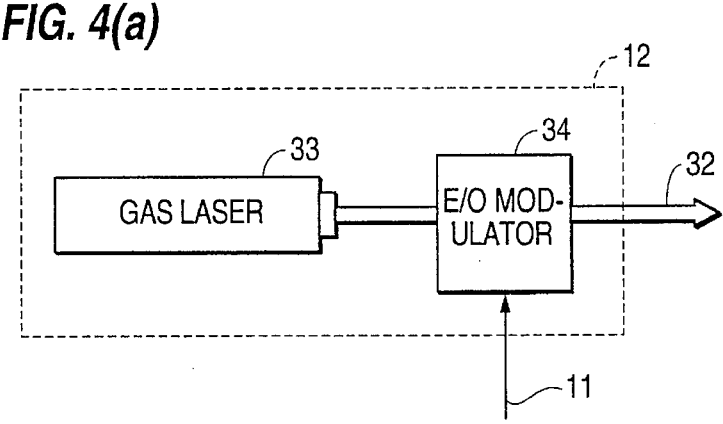
FIGS. 4(a) and 4(b) are a block diagrams of laser modulators according to one embodiment of this invention.
Figure 4B:
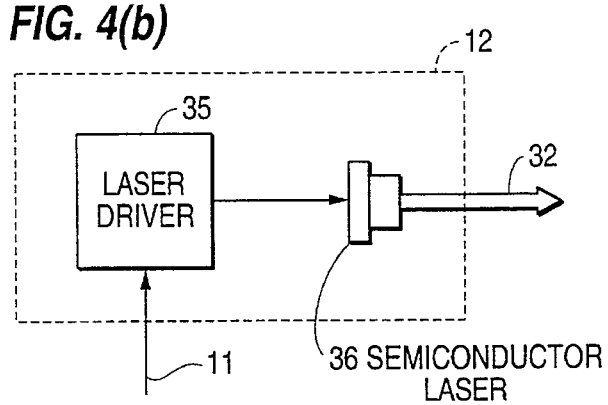

In this embodiment, an explanation is given in which the disk 3 is a single optical disk, but the invention is not limited thereto, and it may be a disk plate for forming a ROM disk used for reproduction only, and it can be applied for a rewritable magnetooptical disk and a phase changeable optical disk. In addition, the laser modulator 12 can be realized, as shown in FIGS. 4(a) and 4(b), by combining a gas laser 33 with an E/O modulator 34 or by combining a semiconductor laser 36 with a laser driving circuit 35 that directly drives the same.

Figure 3:
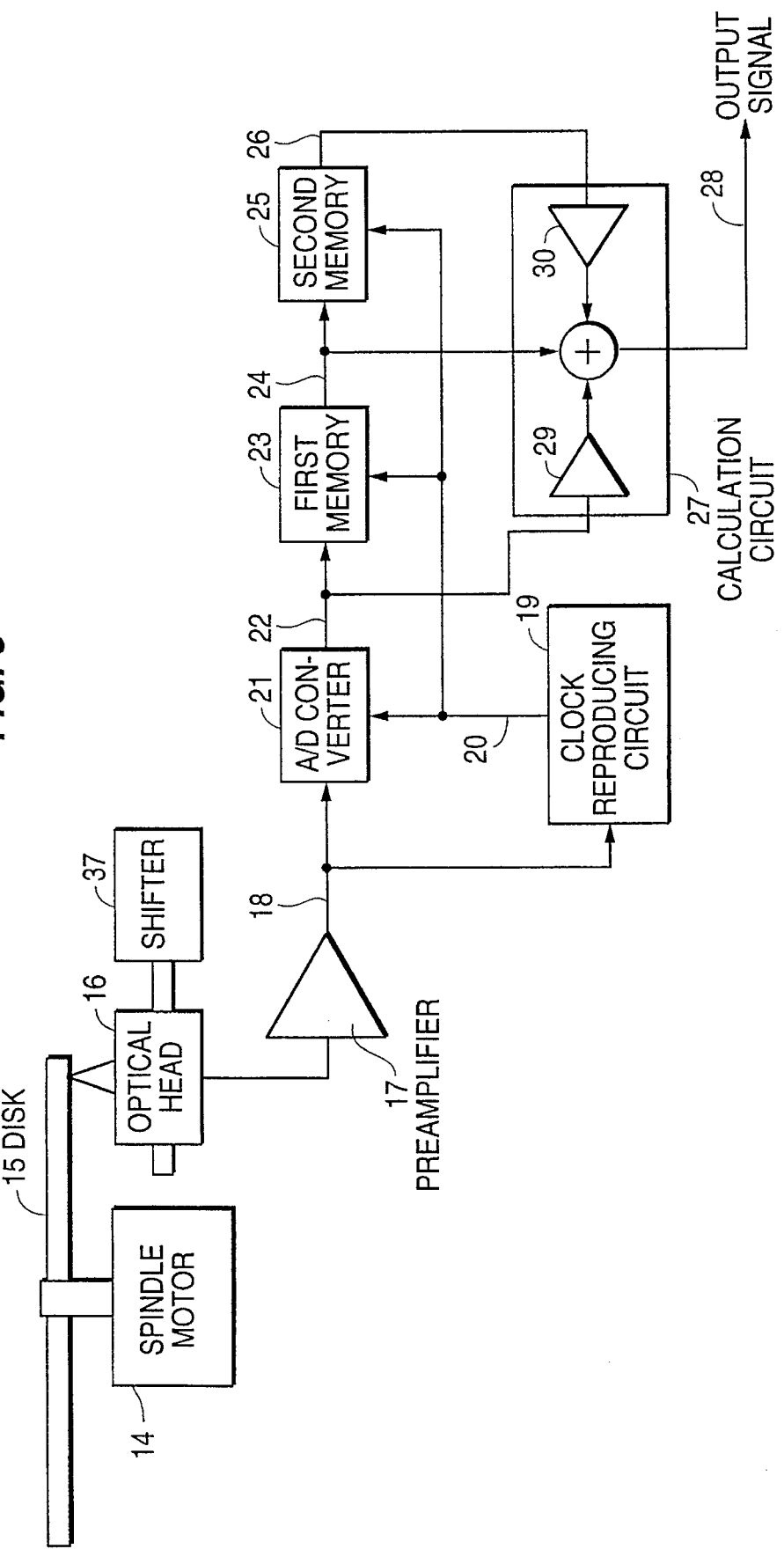
FIG. 3 is a block diagram of a disk reproducing apparatus according to one embodiment of this invention.

Next, FIG. 3 is a block diagram of a disk reproducing apparatus according to one embodiment of this invention. In FIG. 3, a disk 15 to which data information are recorded through the disk recording apparatus explained above is rotated by a spindle motor 14. A laser beam is applied through an optical head 16 and a shifter 37 for moving the disk in the radial direction thereof to signal pits formed on the disk in order to perform focusing and tracking to thereby detect a signal to be reproduced. The signal thus detected is subjected to amplification by a pre-amplifier 17 to obtain a reproduced signal 18. The reproduced signal 18 is sent to a clock reproducing circuit 19 to obtain a reproduced clock 20 phase-synchronized with the reproduced signal 18. In this case, even when the disk 15 is rotated at a constant rotational speed by means of the CAV system, the reproduced signal 18 may have time axis variation called jitter due to the eccentricity of the disk 15 and/or the uneven rotation of the spindle motor 14.

As a result, in order to sample the reproduced signal 18, the clock component is extracted in the clock reproducing circuit 19 from the reproduced signal 18 to obtain a reproduced clock 20 which follows the jitter by means, for example, of a phase looked loop (PLL). Then, the reproduced signal 18 is sent to an analog/digital (A/D) converter 21 and sampled and quantized with the reproduced clock 20 to be converted into a digital data.

In order to obtain the reproduced signals of the adjacent tracks to be positioned just beside the reproduced signal of the targeted track reproduced by the one beam method from the disk 15, theoretically, two high accuracy delay circuits each corresponding to the time of one rotation of the disk are used as a pair, and as a result, the signal of one rotation before and the signal of one rotation after the signal of the targeted track can be obtained simultaneously, which respectively coincide with the reproduced signals of the adjacent tracks. In this case, however, the time required for one rotation of the disk is actually unstable due to the rotation jitter of the disk while being reproduced.

Figure 5:
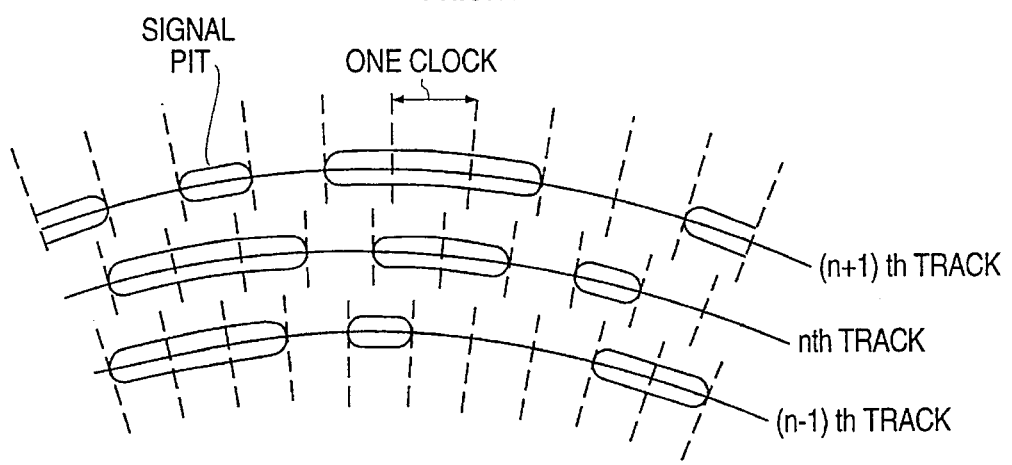
FIG. 5 is a signal arrangement diagram of a disk according to the prior art.

In addition, when it is a reproduced signal from a conventional disk to which recording has been made normally, the recorded signals for one rotation of the disk, namely, the number of clocks and the phase of the recorded signals from the signal of the targeted track to the signal of each of the adjacent tracks just beside thereto are unstable as shown in FIG. 5. As a result, even if high accuracy delay circuits are introduced, the signals of the adjacent tracks cannot be obtained by the one beam reproduction method. In this case, however, according to the disk reproducing apparatus of this embodiment, the above-mentioned problem can be solved if reproducing a disk having recorded signal pits aligned in the radial direction thereof in advance. Namely, by using memories each having a capacity of the number of clocks of recorded signals for one rotation of the disk as a delay circuit, the signals of the adjacent tracks thereto can be obtained easily with high in accuracy.

As a result, the reproduced signal 18 from the disk 15 is converted through the A/D converter 21 into a digital data signal. The digital data signal is sent to a first memory 23 and a second memory 25 with the reproduced clock 20 as the operation clock to be closely delayed successively by one rotation of the disk. Now, supposing that the targeted track to be reproduced is expressed as an nth track (where n is an integer), the reproduced signal of one rotation before the signal of the targeted track becomes a reproduced signal 26 of an (n−1)th track, the reproduced signal of the targeted track becomes a reproduced signal 24 of the nth track, and the reproduced signal of one rotation after the signal of the targeted track becomes a reproduced signal 22 of an (n+1)th track, which can be taken out respectively from the both sides of the first memory 23 and the second memory 25.

Further, in order to cancel the crosstalk component from the reproduced signal 24 of the nth track, a signal obtained by multiplying one negative coefficient to the reproduced signal 22 of the (n+1)th track in a first multiplier 29, the reproduced signal 24 of the nth track, and a signal obtained by multiplying another negative coefficient to the reproduced signal 26 of the (n−1)th track in a second multiplier 30 are added through a calculation circuit 27 to thereby obtain an output signal 28 that the crosstalk component is offset. These negative coefficients shown above are set at a value such that the crosstalk component from the adjacent tracks contained in the reproduced signal of the nth track can be just canceled with the reproduced signal 26 of the (n+1)th track and the reproduced signal 22 of the (n−1)th track.

With the structure and procedures as explained above, the disk reproducing apparatus of this embodiment reproduces data previously recorded in alignment in the radial direction of the disk by the optical head of one beam and processes digitally any crosstalk from the adjacent tracks generated in the optical system by the digital signal processing system using memories, so that such crosstalk can be largely reduced.

As explained above, the disk recording apparatus of this invention makes it possible to provide such a disk that any signal recorded thereon closely coincide in phase between each adjacent tracks. Further, the disk reproducing apparatus of this invention makes it possible to cancel an unnecessary crosstalk component of a reproduced signal by the signal processing system using memories.

Consequently, even if signal data are recorded on a disk with a track space that is narrower than would be used conventionally, the recording density in the radial direction of the disk can be largely improved without degrading the quality of a reproduced signal, the being extremely effective in the high density recording of data on the disk. Accordingly, this invention is largely effective when used for applications where data are required to be recorded at a high density, such as, a digital video file and the like.

What is claimed is:

1. A disk recording apparatus for receiving a digital data input signal and a reference clock signal that is synchronized therewith to record said digital data input signal on a disk, said recording apparatus comprising:

a spindle motor for rotating said disk;

a rotary encoder for generating a synchronizing pulse synchronized with a rotation phase of said disk;

a servo circuit for controlling said spindle motor in response to said reference clock signal and said synchronizing pulse;

a clock reproducing circuit for generating a rotation synchronizing clock synchronized in phase with synchronizing pulse;

a memory for writing thereinto said digital data input signal at a timing in accordance with said reference clock and for reading therefrom the thus written signal at a timing in accordance with said rotation synchronizing clock to thereby obtain a recording signal;

a laser modulator for generating a modulated laser beam in response to said recording signal;

an optical head for focusing said modulating laser beam on a surface of said disk to record said recording signal; and a shifting means for moving said optical head in a radial direction of said disk.

2. A disk recording apparatus for reproducing signals recorded on a disk, wherein phases of the signals between each of adjacent tracks of said disk substantially coincide with a clock unit in a radial direction of said disk, said reproducing apparatus comprising:

a spindle motor for rotating said disk;

an optical head for detecting the signals recorded on said disk using a laser beam to obtain a reproduced signal;

a shifting means for moving said optical head in the radial direction of said disk;

a pre-amplifier for amplifying said reproduced signal;

a clock reproducing circuit for generating a reproduced clock synchronized in phase with an output signal of said pre-amplifier;

an analog/digital converter for sampling the output signal of said pre-amplifier at a timing in accordance with said reproduced clock to obtain a digital data signal;

a first memory for obtaining, when said digital data signal is defined as a reproduced signal of an $(n+1)$th track (where n is an integer), a reproduced signal of an nth track by delaying the reproduced signal of said $(n+1)$th track by one rotation of said disk;

a second memory for obtaining a reproduced signal of an $(n-1)$th track by further delaying the reproduced signal of said nth track by one rotation of said disk; and a calculation circuit for adding a signal obtained by multiplying the reproduced signal of said $(n+1)$th track by a coefficient, a signal obtained by multiplying the reproduced signal of said $(n-1)$th track by a coefficient and the reproduced signal of said nth track to obtain an output reproduced signal.

3. An optical disc having information recorded thereon in the form of a plurality of signal pits contained in recording tracks which extend around a principle surface of said optical disc, said principle surface of said optical disc containing plural sector divisions each extending radially along said principle surface and each defined by a clock unit of said optical disc, each of said plurality of signal pits having opposite edges which define respective phase changes of the information recorded on said optical disc, wherein each of said opposite edges of each of said plurality of signal pits is aligned in a radial direction of said optical disc with one of said plural sector divisions of said optical disc.

* * * * *